United States Patent
Snape et al.

(10) Patent No.: US 10,352,241 B2
(45) Date of Patent: Jul. 16, 2019

(54) GAS TURBINE ENGINE THERMAL MANAGEMENT SYSTEM

(71) Applicant: UNITED TECHNOLOGIES CORPORATION, Farmington, CT (US)

(72) Inventors: Nathan Snape, Tolland, CT (US); Gabriel L. Suciu, Glastonbury, CT (US); Brian D. Merry, Andover, CT (US); James D. Hill, W. Abington Township, PA (US); William K. Ackermann, East Hartford, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 0 days.

(21) Appl. No.: 15/970,516

(22) Filed: May 3, 2018

(65) Prior Publication Data

US 2018/0252162 A1    Sep. 6, 2018

Related U.S. Application Data

(62) Division of application No. 14/600,445, filed on Jan. 20, 2015, now Pat. No. 9,988,986.

(51) Int. Cl.
*F02C 7/12*    (2006.01)

(52) U.S. Cl.
CPC .......... *F02C 7/12* (2013.01); *F05D 2260/213* (2013.01)

(58) Field of Classification Search
CPC .. F01D 25/18; F02C 7/224; F02C 7/14; F02C 7/12; F05D 2260/213
See application file for complete search history.

(56) References Cited

U.S. PATENT DOCUMENTS

| 7,984,606 B2 | 7/2011 | Smith | |
| 2013/0202406 A1* | 8/2013 | Papa | F02C 7/14 415/1 |

OTHER PUBLICATIONS

USPTO, Restriction/Election Office Action dated Jan. 13, 2017 in U.S. Appl. No. 14/600,445.
USPTO, Preinterview First Action Interview Office Action dated Jun. 15, 2017 in U.S. Appl. No. 14/600,445.
USPTO, First Action Interview Office Action dated Oct. 20, 2017 in U.S. Appl. No. 14/600,445.
USPTO, Notice of Allowance dated Apr. 25, 2018 in U.S. Appl. No. 14/600,445.

* cited by examiner

*Primary Examiner* — Janie M Loeppke
(74) *Attorney, Agent, or Firm* — Snell & Wilmer L.L.P.

(57) ABSTRACT

The present disclosure provides systems and methods related to thermal management systems for gas turbine engines. For example, a thermal management system comprises a thermally neutral heat transfer fluid circuit, a first heat exchanger disposed on the fluid circuit, and a second heat exchanger disposed on the fluid circuit.

9 Claims, 4 Drawing Sheets

GAS TURBINE ENGINE THERMAL MANAGEMENT SYSTEM

CROSS-REFERENCE TO RELATED APPLICATIONS

This application is a divisional of, claims priority to and the benefit of, U.S. Ser. No. 14/600,445 filed Jan. 20, 2015 and entitled "GAS TURBINE ENGINE THERMAL MANAGEMENT SYSTEM," which is incorporated herein in its entirety for all purposes.

FIELD OF THE DISCLOSURE

The present disclosure relates to thermal management systems for gas turbine engines, and more particularly, to thermal management systems utilizing a thermally neutral heat transfer fluid.

BACKGROUND OF THE DISCLOSURE

Gas turbine engines typically include at least a compressor section, a combustor section, and a turbine section, disposed about an axial centerline and arranged in flow series with an upstream inlet at the compressor section and a downstream exhaust at the turbine section. As compressed air passes from the compressor section to the combustor section, it is mixed with fuel and burned. As hot combustion gases expand, they are converted to work by the turbine section, supplying power to the engine and other engine loads.

The heat generated by a gas turbine engine may be managed by a thermal management system. Thermal management systems may utilize engine fluids such as fuel and oil to transfer excess engine heat and cool the engine. Such thermal management systems may be associated with high fluid flow rates, repeated temperature fluctuations, and long circulation paths.

SUMMARY OF THE DISCLOSURE

In various embodiments, the present disclosure provides thermal management systems utilizing a thermally neutral heat transfer fluid. A thermal management system may comprise a fluid circuit, at least one fluid to air heat exchanger incorporated into the fluid circuit, at least one fluid to fluid heat exchanger incorporated into the fluid circuit, and a thermally neutral heat exchange fluid configured to circulate in the fluid circuit. The thermal management system may further comprise at least one flow rate device. The thermal management system may be configured to transfer heat from at least one of engine oil or engine fuel to the thermally neutral heat transfer fluid, and from the thermally neutral heat transfer fluid to air or fuel.

In various embodiments, the present disclosure provides methods for cooling a gas turbine engine. A method may comprise providing a thermal management system, circulating a thermally neutral heat transfer fluid within a fluid circuit, transferring heat from at least one of bleed air, engine oil or engine fuel to the thermally neutral heat transfer fluid, transferring heat from the thermally neutral heat transfer fluid to air, and transferring the air externally from the engine.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain the principles of the disclosure.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation.

For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

For example, in the context of the present disclosure, methods and devices may find particular use in connection with gas turbine engines. However, various aspects of the disclosed embodiments may be adapted for optimized performance in a variety of engines. As such, numerous applications of the present disclosure may be realized.

Figure 1:
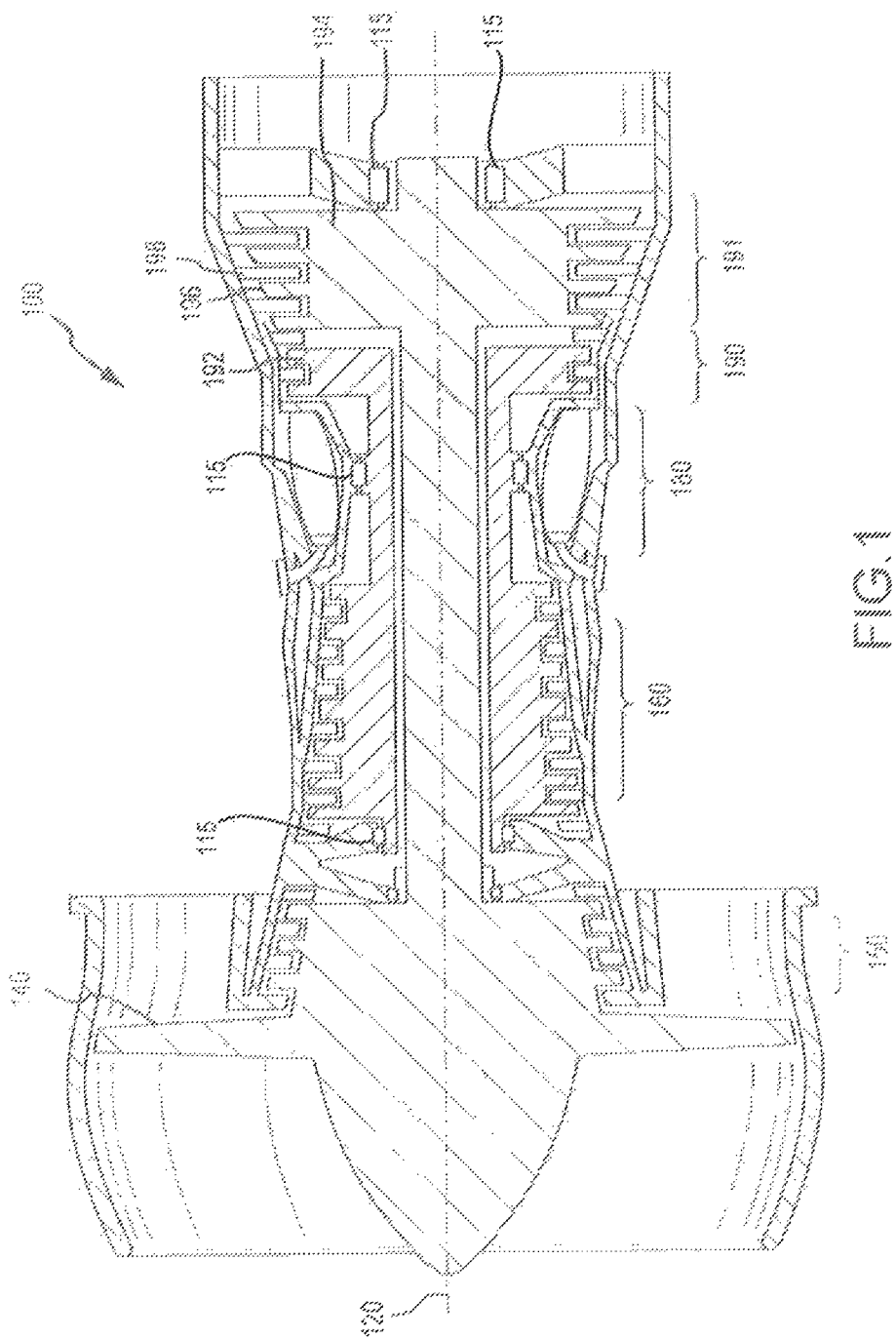
FIG. 1 illustrates a schematic cross-section view of a gas turbine engine in accordance with various embodiments.

Referring to FIG. 1, a gas turbine engine 100 (such as a turbofan gas turbine engine) is illustrated according to various embodiments. Gas turbine engine 100 is disposed about axial centerline axis 120, which may also be referred to as axis of rotation 120. Gas turbine engine 100 may comprise a fan 140, compressor sections 150 and 160, a combustion section 180, and turbine sections 190, 191. The fan 140 may drive air into compressor sections 150, 160, which further drive air along a core flow path for compression and communication into the combustion section 180. Air compressed in the compressor sections 150, 160 may be mixed with fuel and burned in combustion section 180 and expanded across the turbine sections 190, 191. The turbine sections 190, 191 may include high pressure rotors 192 and low pressure rotors 194, which rotate in response to the expansion. The turbine sections 190, 191 may comprise alternating rows of rotary airfoils or blades 196 and static airfoils or vanes 198. Cooling air may be supplied to the turbine sections 190, 191 from the compressor sections 150, 160. A plurality of bearings 115 may support spools in the gas turbine engine 100. FIG. 1 provides a general understanding of the sections in a gas turbine engine, and is not intended to limit the disclosure. The present disclosure may extend to all types of applications and to all types of turbine engines, including turbofan engines, turboprop engines, and turbojet engines.

Multiple sections of the gas turbine engine 100 generate heat during engine operation, including the fan 140, the compressor sections 150, 160, the combustion section 180, the turbine sections 190, 191, and mechanical components such as bearings 115 and gearboxes (not shown). The heat may be carried by fluids that are communicated throughout these and other portions of the engine 100. For example, fuel and oil may be circulated throughout the gas turbine engine 100 and carry a portion of the heat generated during engine operation. Various fluids and media may be circulated throughout an engine during operation and may carry engine heat including, without limitation, air, fuel, oil, lubricating fluid, hydraulic fluid, thermally neutral heat transfer fluid, or any other fluid suitable for circulating in a gas turbine engine.

A gas turbine engine may further comprise a thermal management system. Typical thermal management systems may utilize engine oil and fuel to transfer heat from various portions of the engine to other portions of the engine or externally from the engine. For example, an oil circulation system and a fuel circulation system may have primary functions exclusive of their functions in the thermal management system. For example, oil may function primarily as a lubricant of various engine components (i.e., oil's primary function); fuel may function primarily as an energy source (i.e., fuel's primary function). The oil and fuel circulation systems may carry oil and fuel to various portions of the engine to operate as heat sinks in a thermal management system. Such thermal management systems typically require oil and/or fuel to be communicated farther distances and to various portions of the engine to perform thermal management functions rather than to perform primary functions. Such thermal management systems typically subject oil and/or fuel to repeated and prolonged temperature fluctuations above and below the optimum operating temperature of oil and/or fuel for carrying out primary functions. Such thermal management systems may require increased volume and/or flow rate of oil and/or fuel in their respective circulation systems to meet the heat sink requirements of a given operating environment.

In various embodiments of the present disclosure, a thermal management system utilizing thermally neutral heat transfer fluid is provided. A thermal management system may comprise a fluid circuit, a first heat exchanger 232 disposed on the fluid circuit, a second heat exchanger 231 disposed on the fluid circuit, and a thermally neutral heat transfer fluid configured to circulate in the fluid circuit. Various heat exchangers may be incorporated into the fluid circuit including, without limitation, air to fluid heat exchangers and fluid to fluid heat exchangers. Air to fluid heat exchangers may be configured to heat or cool fluid by exposing it to air having a different temperature than the fluid. In various embodiments, fluids carrying engine heat may be cooled by exposure to external engine air, air bled from various portions of the engine ("bleed air"), or any other source of air lower in temperature than the heat-carrying fluid. In various embodiments, fluids may be heated by exposure to external engine air, air bled from various portions of the engine ("bleed air"), or any other source of air higher in temperature than the fluid. Fluid to fluid heat exchangers may be configured to heat or cool a first fluid by exposing it to a second fluid having a different temperature than the first fluid.

Figure 2:
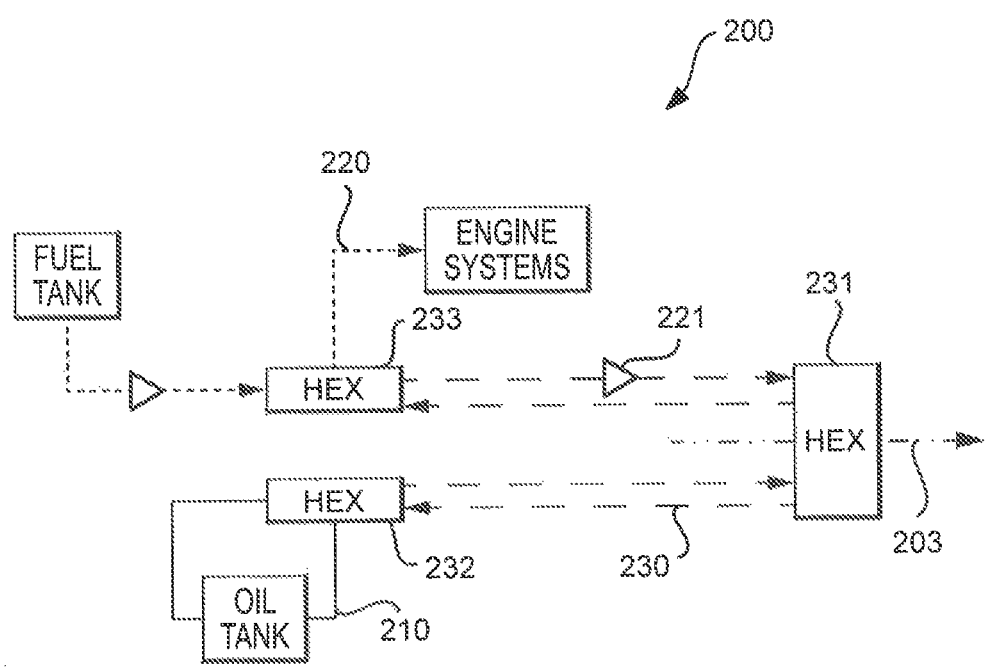
FIG. 2 illustrates a schematic diagram of a thermal management system in accordance with various embodiments.

In various embodiments and with reference to FIG. 2, the thermal management system 200 may comprise at least one air to heat transfer fluid heat exchanger 231. The air to heat transfer fluid heat exchanger 231 may be configured to cool thermally neutral heat transfer fluid by exposing it to air 203 having a lower temperature than the thermally neutral heat transfer fluid. The air 203 may be communicated to the air to heat transfer fluid heat exchanger 231 and may have a lower temperature than the thermally neutral heat transfer fluid disposed in the air to heat transfer fluid heat exchanger 231. The air 203 may absorb heat from the thermally neutral heat transfer fluid before being communicated externally from the engine. In various embodiments, the air 203 may be external engine air, bleed air, or any other suitable source of air.

In various embodiments, the thermal management system 200 may comprise at least one heat transfer fluid to oil heat exchanger 232. The heat transfer fluid to oil heat exchanger 232 may be configured to cool oil by exposing it to thermally neutral heat transfer fluid having a lower temperature than the oil. Such exposure may occur without combining, mixing, or contaminating the oil with the thermally neutral heat transfer fluid. Stated another way, oil and thermally neutral heat transfer fluid may come into thermal contact without coming into physical contact. The thermally neutral heat transfer fluid may absorb heat from the oil in the heat transfer fluid to oil heat exchanger 232. Exposure and heat transfer may occur in the heat transfer fluid to oil heat exchanger 232.

In various embodiments, the thermal management system 200 may comprise at least one heat transfer fluid to fuel heat exchanger 233. The heat transfer fluid to fuel heat exchanger 233 may be configured to heat or cool fuel by exposing it to thermally neutral heat transfer fluid having a different temperature than the fuel. Such exposure may occur without combining, mixing, or contaminating the fuel with the thermally neutral heat transfer fluid. Stated another way, oil and thermally neutral heat transfer fluid may come into thermal contact without coming into physical contact. In various embodiments, the thermally neutral heat transfer fluid may absorb heat from the fuel in the heat transfer fluid to fuel heat exchanger 233. In further embodiments, fuel may absorb heat from the heat transfer fluid in the heat transfer fluid to fuel heat exchanger 233. Exposure and heat transfer may occur in the heat transfer fluid to fuel heat exchanger 333.

Numerous configurations of the present disclosure may be realized. In various embodiments, a heat exchanger may comprise a heat transfer fluid to oil heat exchanger. A thermal management system may comprise an air to heat transfer fluid heat exchanger and a heat transfer fluid to oil heat exchanger. In various embodiments, a heat exchanger may comprise a heat transfer fluid to fuel heat exchanger. A thermal management system may comprise an air to heat transfer fluid heat exchanger and a heat transfer fluid to fuel heat exchanger. A thermal management system may comprise an air to heat transfer fluid heat exchanger 231, a heat transfer fluid to oil heat exchanger 232, and a heat transfer fluid to fuel heat exchanger 233, each of which may be disposed on the fluid circuit 230.

The fluid circuit 230 may communicate the thermally neutral heat transfer fluid independently of at least one of a primary function oil circulation system 210 or a primary function fuel circulation system 220. A primary function oil circulation system may perform functions exclusive of any function in the thermal management system and may be configured to communicate oil by the most direct route possible to only those portions of the engine in which oil performs a primary function. The fluid circuit may be configured to communicate thermally neutral heat transfer fluid to a portion of the primary function oil circulation system; for example, a heat transfer fluid to oil heat exchanger may be disposed on or adjacent to a primary function oil circulation system.

Similarly, a primary function fuel circulation system may perform functions exclusive of any function in the thermal management system and may be configured to communicate fuel by the most direct route possible to only those portions of the engine in which fuel performs a primary function. The fluid circuit may be configured to communicate thermally neutral heat transfer fluid to a portion of the primary function fuel circulation system; for example, a heat transfer fluid to fuel heat exchanger may be disposed on or adjacent to a primary function fuel circulation system.

The elements of the thermal management system may be arranged in various configurations to create various fluid circuit pathways. In various embodiments, the fluid circuit 230 and heat exchangers 231, 232, 233, may be arranged such that the thermally neutral heat transfer fluid is communicated from the heat transfer fluid to oil heat exchanger 232, to the air to heat transfer fluid heat exchanger 231, to the heat transfer fluid to fuel heat exchanger 233, and back to the air to heat transfer fluid heat exchanger 231, before returning to the heat transfer fluid to oil heat exchanger 232.

Figure 3:
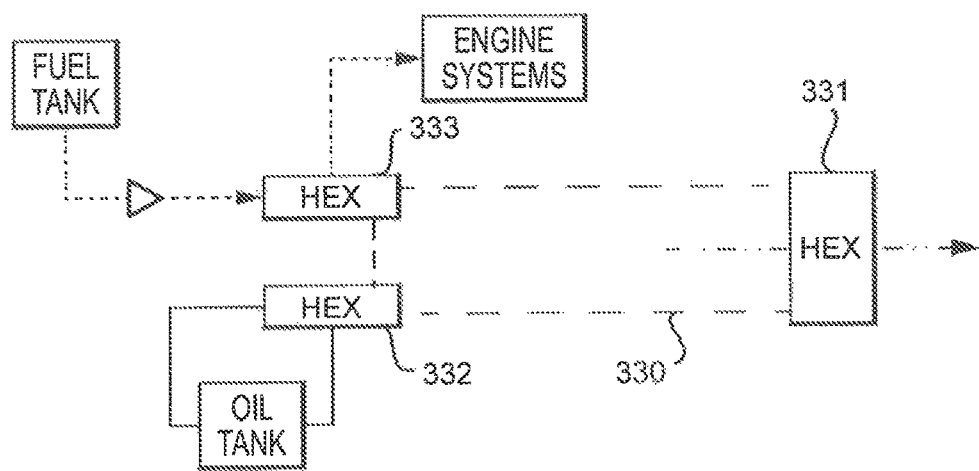
FIG. 3 illustrates a schematic diagram of a thermal management system in accordance with various embodiments.

In various embodiments and with reference to FIG. 3, a heat transfer fluid to oil heat exchanger 332, an air to heat transfer fluid heat exchanger 331, and a heat transfer fluid to fuel heat exchanger 333 may be arranged in series with one another on a thermally neutral heat transfer fluid circuit 330. The fluid circuit 330 may be configured to circulate thermally neutral heat transfer fluid from the heat transfer fluid to oil heat exchanger 332, to the air to heat transfer fluid heat exchanger 331, to the heat transfer fluid to fuel heat exchanger 333, and back to the heat transfer fluid to oil heat exchanger 332. In various embodiments, heat may be transferred from the heat transfer fluid to fuel in the heat transfer fluid to fuel heat exchanger 333, increasing the temperature of fuel. In various embodiments, heat may be transferred from bleed air to the heat transfer fluid in the air to heat transfer fluid heat exchanger 331, decreasing the temperature of bleed air. The fluid circuit 330 may be configured to circulate thermally neutral heat transfer fluid from the heat transfer fluid to oil heat exchanger 332, to the heat transfer fluid to fuel heat exchanger 333, to the air to heat transfer fluid heat exchanger 331, and back to the heat transfer fluid to oil heat exchanger 332.

In various embodiments, the thermally neutral heat transfer fluid may comprise various materials capable of absorbing engine heat with or without fully entering the vapor phase. For example, commercially available heat transfer fluids such as Therminol® and DOWTHERM® may be used in various embodiments; a mixture of glycol and water may be used in various embodiments. That being said, although an exhaustive list of fluids is not included herein, one skilled in the relevant art will appreciate that various conventional fluids and commercially available fluids may be used, all of which fall within the scope of the present disclosure. Additionally, various fluids may be combined to achieve the most attractive characteristics of an existing, or as yet unknown, thermally neutral heat transfer fluid, whose characteristics may potentially decrease the weight or viscosity, or increase the heat sink capacity, cost efficiency, or durability of the thermally neutral heat transfer fluid. In various embodiments, the thermally neutral heat transfer fluid may comprise a fluid with a vapor phase transfer temperature greater than the operating temperature of the gas turbine engine.

In various embodiments and with reference to FIG. 2, a thermal management system 200 may further comprise at least one flow rate device 221. The flow rate device 221 may comprise a pump, valve, or other suitable device for regulating the flow rate of the thermally neutral heat transfer fluid in the fluid circuit 230. In various applications and under various operating conditions, an engine may generate variable levels of heat and, accordingly, may require a thermal management system with variable heat sink capacity. The heat sink capacity of the thermal management system 200 may be varied by changing the flow rate of the thermally neutral heat transfer fluid. In various embodiments, the flow rate device 221 may be configured to vary the flow rate of the thermally neutral heat transfer fluid.

In various embodiments, a gas turbine engine may comprise a primary function oil circulation system, a primary function fuel circulation system, and a thermal management system. The thermal management system may comprise a fluid circuit, at least two exchangers incorporated into the fluid circuit, and a thermally neutral heat transfer fluid configured to circulate in the fluid circuit. The thermal management system may be configured to exchange heat with at least one of the primary function oil circulation system and the primary function fuel circulation system. As described herein, various configurations and embodiments of the thermal management system may be realized, all of which may be comprised in a gas turbine engine.

Figure 4:
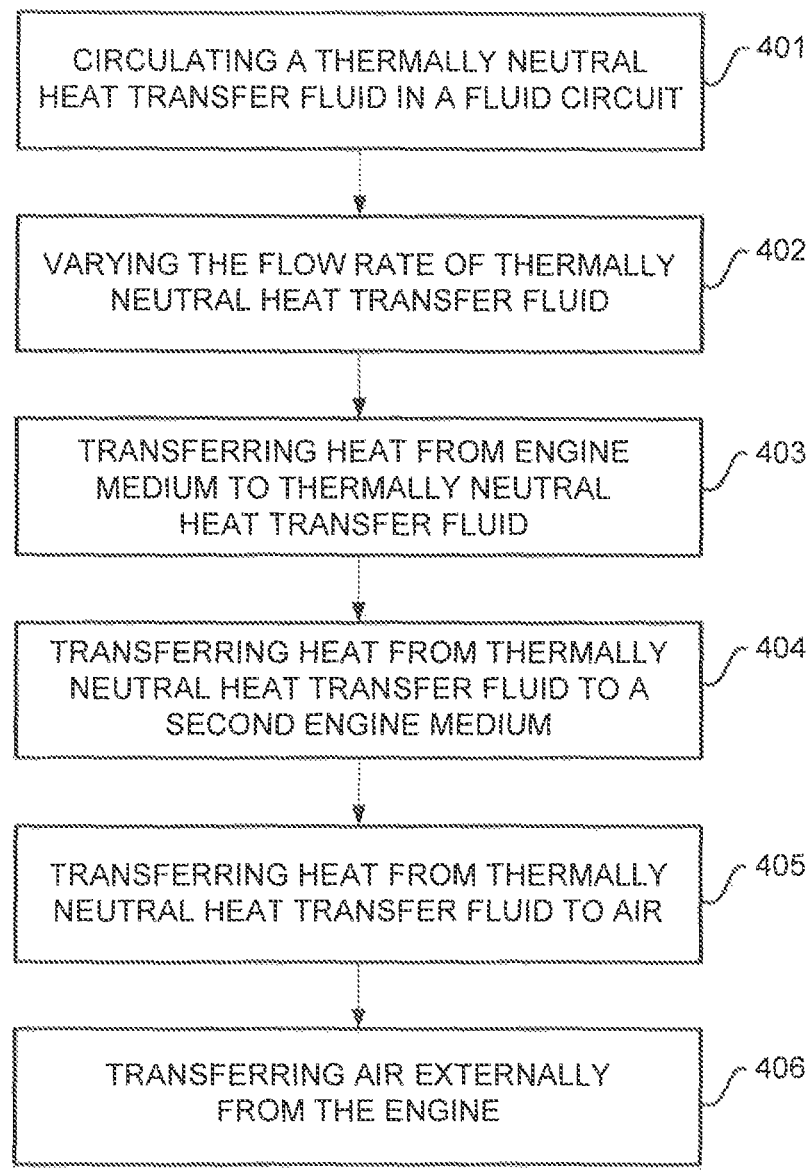
FIG. 4 illustrates a method of transferring heat in a gas turbine engine in accordance with various embodiments.

In various embodiments and with reference to FIG. 4, a method of transferring heat in a gas turbine engine is provided. The method may comprise circulating a thermally neutral heat transfer fluid within a fluid circuit (Step 401) and transferring heat from a first engine medium (Step 403) to the thermally neutral heat transfer fluid. The engine medium may comprise bleed air, engine oil, engine fuel, or any other medium suitable for circulating in a gas turbine engine. The method may further comprise transferring heat from the thermally neutral heat transfer fluid to air (Step 405), and transferring the air externally from the engine (Step 406). In various embodiments, the method may further comprise transferring heat from the thermally neutral heat transfer fluid to a second engine medium (Step 404). In various embodiments, the method may further comprise varying the flow rate of the thermally neutral heat transfer fluid (Step 402).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Devices and methods are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A gas turbine engine, comprising:
   a primary function oil circulation system configured to circulate oil;
   a primary function fuel circulation system configured to circulate fuel; and
   a thermal management system comprising a fluid circuit configured to circulate thermally neutral heat transfer fluid, a first heat exchanger disposed on the fluid circuit, a second heat exchanger disposed on the fluid circuit, and a third heat exchanger disposed on the fluid circuit;
   wherein the thermal management system is configured to exchange heat with both the oil of the primary function oil circulation system and the fuel of the primary function fuel circulation system using the thermally neutral heat transfer fluid;
   wherein:
      the first heat exchanger comprises an air to heat transfer fluid heat exchanger configured to transfer heat between air and the thermally neutral heat transfer fluid;
      the second heat exchanger comprises a heat transfer fluid to oil heat exchanger configured to transfer heat between the thermally neutral heat transfer fluid and the oil; and
      the third heat exchanger comprises a heat transfer fluid to fuel heat exchanger configured to transfer heat between the thermally neutral heat transfer fluid and the fuel.

2. The gas turbine engine of claim 1, wherein the first heat exchanger, the second heat exchanger, and the third heat exchanger are arranged in series on the fluid circuit.

3. The gas turbine engine of claim 1, wherein the first heat exchanger is disposed between the second heat exchanger and the third heat exchanger such that the thermally neutral heat transfer fluid flows through the first heat exchanger in order to pass from one of the second heat exchanger and the third heat exchanger to the other of the second heat exchanger and the third heat exchanger.

4. A method of transferring heat in a gas turbine engine, comprising
   circulating a thermally neutral heat transfer fluid in a fluid circuit of a thermal management system, wherein a first heat exchanger is disposed on the fluid circuit and a second heat exchanger is also disposed on the fluid circuit;
   transferring heat between a first engine fluid and the thermally neutral heat transfer fluid at the second heat exchanger; and
   transferring heat between the thermally neutral heat transfer fluid and air at the first heat exchanger;
   wherein the second heat exchanger is disposed adjacent to a primary function engine fluid circulation system for the first engine fluid; and
   wherein the primary function engine fluid circulation system performs an engine function using the first engine fluid independent of the step of transferring heat between the first engine fluid and the thermally neutral heat transfer fluid at the second heat exchanger such that the primary function engine fluid circulation system comprises a direct route to a portion of the gas turbine engine in which the first engine fluid is configured to perform the engine function of the primary function engine fluid circulation system.

5. The method of claim 4, wherein a third heat exchanger is disposed on the fluid circuit, wherein the method further comprises:
   transferring heat between the thermally neutral heat transfer fluid and a second engine fluid at the third heat exchanger.

6. The method of claim 4, further comprising:
   varying the flow rate of the thermally neutral heat transfer fluid in the fluid circuit.

7. The method of claim 4, wherein the first engine fluid is oil.

8. The method of claim 4, wherein the first engine fluid is fuel.

9. A thermal management system, comprising:
   a thermally neutral heat transfer fluid circuit;
   a first heat exchanger disposed on the fluid circuit; and
   a heat transfer fluid to fuel heat exchanger disposed on the fluid circuit, wherein the heat transfer fluid to fuel heat exchanger is disposed adjacent to a primary function fuel circulation system such that heat transfer fluid is configured to thermally communicate with fuel in a fuel flow pathway of the primary function fuel circulation system, wherein the primary function fuel circulation system is configured to perform a fuel function independent of the thermal management system, wherein the fuel flow pathway of the primary function fuel circulation system is a direct route to a portion of an engine in which the fuel is configured to perform the fuel function of the primary fuel circulation system.

* * * * *